US012786435B2

(12) United States Patent
Park et al.

(10) Patent No.: US 12,786,435 B2
(45) Date of Patent: Nov. 3, 2026

(54) DIGITAL IMAGE ENCODING METHOD USING ADAPTIVE QUANTIZATION COEFFICIENT

(71) Applicant: HANWHA VISION CO., LTD., Seongnam-si (KR)

(72) Inventors: Seungwon Park, Seongnam-si (KR); Dongjin Park, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 76 days.

(21) Appl. No.: 18/899,718

(22) Filed: Sep. 27, 2024

(65) Prior Publication Data

US 2025/0126277 A1 Apr. 17, 2025

(30) Foreign Application Priority Data

Oct. 12, 2023 (KR) ........................ 10-2023-0135775

(51) Int. Cl.
*H04N 19/176* (2014.01)
*H04N 19/124* (2014.01)
*H04N 19/167* (2014.01)

(52) U.S. Cl.
CPC ......... *H04N 19/176* (2014.11); *H04N 19/124* (2014.11); *H04N 19/167* (2014.11)

(58) Field of Classification Search
CPC ... H04N 19/176; H04N 19/124; H04N 19/167
See application file for complete search history.

(56) References Cited

U.S. PATENT DOCUMENTS 10,200,695 B2 * 2/2019 Dutt ...................... H04N 19/124
2011/0096836 A1 * 4/2011 Einarsson ............ H04N 17/004 375/240.13

* cited by examiner

*Primary Examiner* — Farzana Hossain
(74) *Attorney, Agent, or Firm* — Sughrue Mion, PLLC

(57) ABSTRACT

A method for encoding a digital image including a privacy region, the method includes: determining whether a change occurs in the privacy region within the digital image; and based on no change occurring in the privacy region within the digital image, encoding the privacy region in a skip mode, and based on the change occurring in the privacy region within the digital image, increasing a quantization coefficient (QP) of the privacy region. The encoding information of the privacy region is updated based on the increase of the QP of the privacy region.

20 Claims, 9 Drawing Sheets

DIGITAL IMAGE ENCODING METHOD USING ADAPTIVE QUANTIZATION COEFFICIENT

CROSS-REFERENCE TO RELATED APPLICATION(S)

This application is based on and claims priority to Korean Patent Application No. 10-2023-0135775 filed on Oct. 12, 2023 in the Korean Intellectual Property Office, the disclosure of which is incorporated herein in its entirety by reference.

BACKGROUND

1. Field

The present disclosure relates to a digital image encoding method, and more specifically, to an image encoding method that adaptively applies a quantization coefficient.2.

Description of Related Art

As a surveillance and security system are becoming more widely used, the installation places of various image acquisition devices, including closed-circuit cameras which are core components of the surveillance and security system, are increasing exponentially. An increase in the number of the image acquisition devices, especially the installed cameras, may result in the expanded use of pan-tilt-zoom (PTZ) cameras, which lead to a reduction in blind spots, and thereby enhance the positive effects of crime prevention and accident prevention. On the other hand, a solution may also necessary for the problem of invasion of privacy caused by the inclusion of facial images of the general public.

As the installation places of cameras for surveillance and security systems increase and the performance of the cameras improves, the size of data for processing pictures acquired from the cameras also increases rapidly. However, as the storage and throughput of data increase, the cost associated with storage, transmission line maintenance, expansion of processing capability may undesirably increase.

Advancements in artificial intelligence including machine learning and (moving) picture processing technology are being introduced in the field of the surveillance and security system to address privacy infringement issues. For example, a solution may be utilized that applies a privacy mask (e.g., mosaic) only to a region within a frame where privacy protection is required, such as the face, in a picture acquired from the camera.

SUMMARY

The present disclosure may reduce the cost associated with image encoding and, further, the utilization of an encoded digital image, by adaptively adjusting the size of a quantization coefficient applied to a privacy region within an image frame, in order to efficiently utilize a resource required for data transmission and processing in digital image encoding.

Technical objects to be achieved by the present disclosure are not limited to those described above, and other technical objects that are not mentioned above may also be clearly understood from the descriptions given below by those skilled in the art to which the present disclosure belongs.

Additional aspects will be set forth in part in the description which follows and, in part, will be apparent from the description, or may be learned by practice of the presented embodiments.

According to an aspect of the disclosure, provided is a method for encoding a digital image including a privacy region, the method may include: determining whether a change occurs in the privacy region within the digital image; and based on no change occurring in the privacy region within the digital image, encoding the privacy region in a skip mode, and based on the change occurring in the privacy region within the digital image, increasing a quantization coefficient (QP) of the privacy region.

The method may further include updating encoding information of the privacy region based on the increase of the QP of the privacy region.

Based on the change in the privacy region occurring within the digital image, the QP of the privacy region may be increased to a maximum value provided by an encoder.

The method may further include: determining whether a region of interest (ROI) is included in the digital image, prior to the determining whether the change occurs in the privacy region; and adjusting a QP of the ROI and the QP of the privacy region in the digital image based on the ROI being included in the digital image.

The adjusting the QP of the ROI may include reducing the QP of the ROI.

The adjusting the QP of the ROI and the QP of the privacy region may be based on at least one of a ratio of the ROI and the privacy region in the digital image and an amount of encoding resources saved in the privacy region.

The adjusting the QP of the ROI and the QP of the privacy region in the digital image may be performed for each macroblock within the digital image.

According to an aspect of the disclosure, a method for encoding a digital image including a privacy region, the method may include: determining whether a region of interest (ROI) is included in the digital image; based on the ROI not being included in the digital image: increasing a quantization coefficient (QP) of the privacy region based on the privacy region being a solid mask, and adjusting the QP of the privacy region according to a mosaic level based on the privacy region being a mosaic mask; and updating encoding information of the privacy region based on a change of the QP of the privacy region.

The increasing the QP of the privacy region may include setting the QP of the privacy region to a maximum value provided by an encoder based on the privacy region being a solid mask.

The adjusting the QP of the privacy region may include encoding the privacy region in a skip mode based on the privacy region being a solid mask.

The method may further include: based on the ROI being included in the digital image: adjusting a QP of the ROI and the QP of the privacy region based on a proportion of the ROI and the privacy region in the digital image; and updating encoding information of the ROI and the privacy region based on the adjusted QP of the ROI.

The method may further include: adjusting the QP of the ROI and the QP of the privacy region based on an amount of encoding resources saved in the privacy region; and updating encoding information of the ROI and the privacy region based on the adjusted QP of the ROI.

The method may further include: based on the ROI being included in the digital image: adjusting the QP of the ROI and the QP of the privacy region based on a proportion of the ROI and the privacy region in the digital image, and an amount of encoding resources saved in the privacy region; and updating encoding information of the ROI and the privacy region based on the adjusted QP for the ROI and the adjusted QP of the privacy region.

The adjusting the QP of the ROI may include reducing the QP of the ROI.

The adjusting the QP of the privacy region may include increasing the QP of the privacy region.

According to an aspect of the disclosure, further provided is a non-transitory computer-readable recording medium storing a computer-executable program comprising instructions, which, when executed by one or more processors, cause the one or more processors to execute a digital image encoding method, which may include: inputting a digital image comprising a plurality of frames, where first frames of the plurality of frames include a privacy region, and second frames of the plurality of frames include a privacy region and a region of interest (ROI); increasing a quantization coefficient (QP) of the privacy region based on a change in the privacy region among the plurality of frames; and updating encoding information of the digital image.

With respect to the first frames, the increasing the QP of the privacy region may include at least one of: increasing the QP of the privacy region based on the privacy region being a solid mask, and adjusting the QP of the privacy region according to a mosaic level based on the privacy region being a mosaic mask; and the updating the encoding information may include updating encoding information of the privacy region based on the change of the QP of the privacy region.

With respect to the second frames, the increasing the QP of the privacy region may include: increasing the QP of the privacy region based on an area ratio of the ROI and the privacy region, and decreasing the QP of the ROI in proportion to the increase in QP of the privacy region; and the updating the encoding information may include updating the encoding information of the ROI and the privacy region.

The plurality of frames may include a default region, different than the ROI and the privacy region, where, among the plurality of frames, a QP of the default region is less than the QP of the privacy region, and where, among the second frames of the plurality of frames, the QP of the default region is greater than the QP of the ROI.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
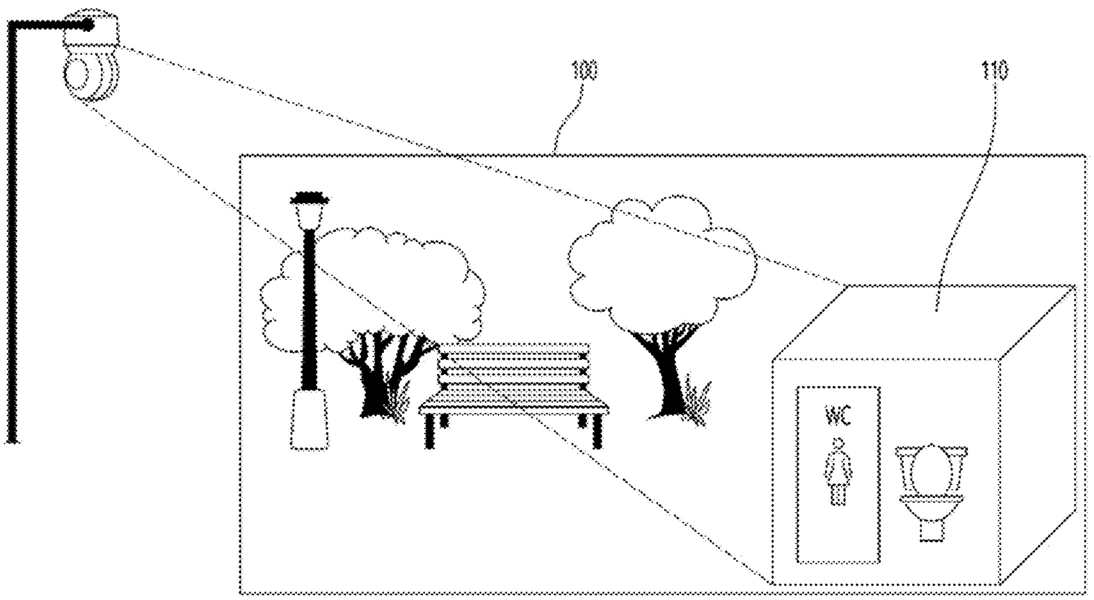
FIG. 1 shows a camera installed outdoors and a frame photographed by the camera according to an embodiment of the disclosure.

The technology disclosed herein may be applied to a method for encoding a digital image. However, the technology disclosed herein is not limited thereto and may also be applied to all devices and methods to which the technical idea may be applied.

Hereinafter, embodiments of the present disclosure will be described in detail with reference to the accompanying drawings. Like reference numerals refer to like parts throughout various figures and embodiments of the present disclosure, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

Throughout the present disclosure, a picture or an image is defined to include both a still image and/or a moving picture having a plurality of frames, and does not exclude various forms of data that may be stored together with digital image data, such as tactile, gustatory, and distance data.

It will be understood that the terms "includes," "comprises," "has," "having," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

As used herein, each of the expressions "A or B," "at least one of A and B," "at least one of A or B," "A, B, or C," "at least one of A, B, and C," and "at least one of A, B, or C," may include one or all possible combinations of the items listed together with a corresponding expression among the expressions.

Figure 2:
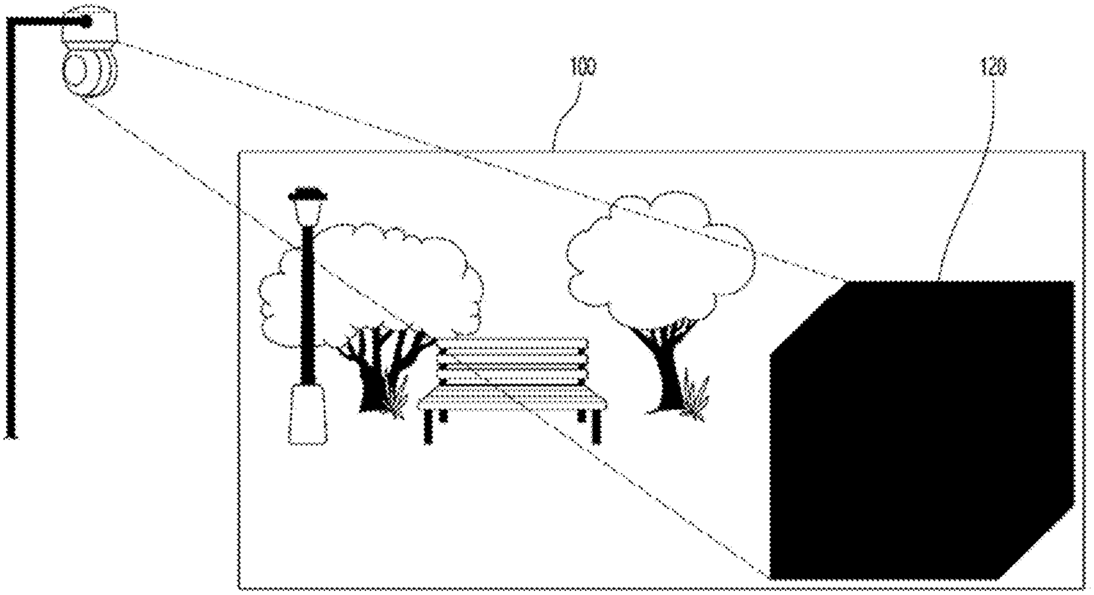
FIG. 2 shows an embodiment in which masking is applied to a privacy region in the frame shown in FIG. 1 according to an embodiment of the disclosure.
Figure 3:
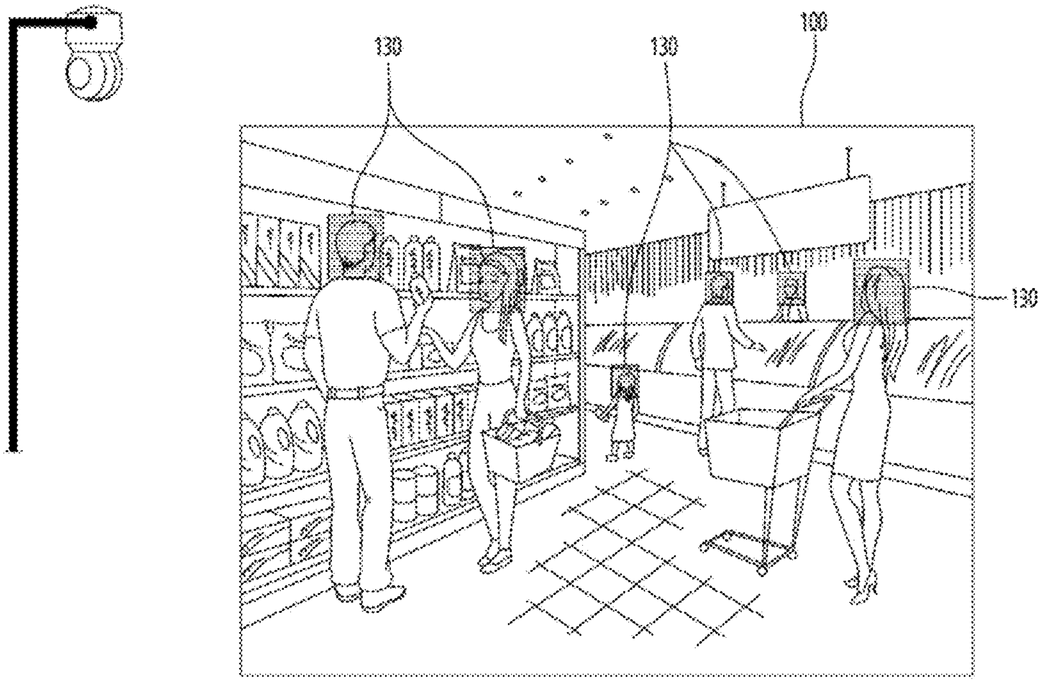
FIG. 3 shows a mosaic being adaptively applied to a privacy region to protect privacy according to an embodiment of the disclosure.

FIGS. 1 to 3 are drawings showing embodiments to which a digital image encoding method of the present disclosure may be applied. Referring to FIG. 1, an image frame 100 may be acquired from a camera installed outdoors, such as in a park. For convenience of explanation, the camera is illustrated as acquiring a rectangular frame 100 at a specific angle and distance. However, this is merely an example, and a camera may be driven to photograph images in various directions and distances, such as a pan-tilt-zoom (PTZ) camera, and the shape of the acquired frame 100 is not limited to a rectangular shape. Within the frame 100 of FIG.

1, regions where images are acquired are obtained without any restrictions. Thus, a region where privacy should be applied, for example, a privacy region 110 such as a bathroom or a security zone may also be coded as digital data in the same or similar manner as other regions within the frame 100.

However, as shown in FIG. 1, there may be a risk of privacy invasion or security leaks when image data is acquired through the camera and further stored in storage. Thus, as shown in FIG. 2, by setting a specific region as a privacy region and applying a solid mask 120, the effect of protecting privacy or enhancing security may be achieved. However, if no special measures are taken during the process of encoding the frame 100 acquired by the camera, there may be a concern that the region of the mask 120 will require a resource for encoding at the same level as other regions, even if it is filled with a single color and pattern. Since there may be no significant difference between data of adjacent pixels within the region of the solid mask 120, the data size required for encoding the portion of the mask 120 may be slightly reduced even if a general encoding method is applied. However, continuously controlling the codec by applying a Quantization Parameter (QP) required for encoding to the region of the mask 120 may remain as an obstacle to maximizing resource utilization.

FIG. 3 is a diagram illustrating an environment in which privacy is required in an indoor environment, unlike FIGS. 1 and 2. Referring to FIG. 3, in a place used by many unspecified people, such as a supermarket, there may be cases where privacy may be desirable to protect detection of one or multiple faces. Within the digital image frame 100 of FIG. 3, privacy may be applied to faces of customers in the supermarket, for example. In this case, a mosaic 130 may be applied as a mask for an image acquired from the camera, for example. In recent years, with the advancement of image processing and camera technology, it may be possible to recognize and track the type and location of an object. By applying such image processing/camera technology, it may therefore be possible to track the face of a person when a person moves. Therefore, the masking region to which the mosaic 130 (or solid mask) is applied may also actively move along with the movement of the object. Even when the mosaic 130 is applied in this way, continuously controlling the codec by applying the QP required for encoding to the region of the mosaic 130 as described with reference to FIGS. 1 and 2 may be a waste of resource utilization.

Figure 4:
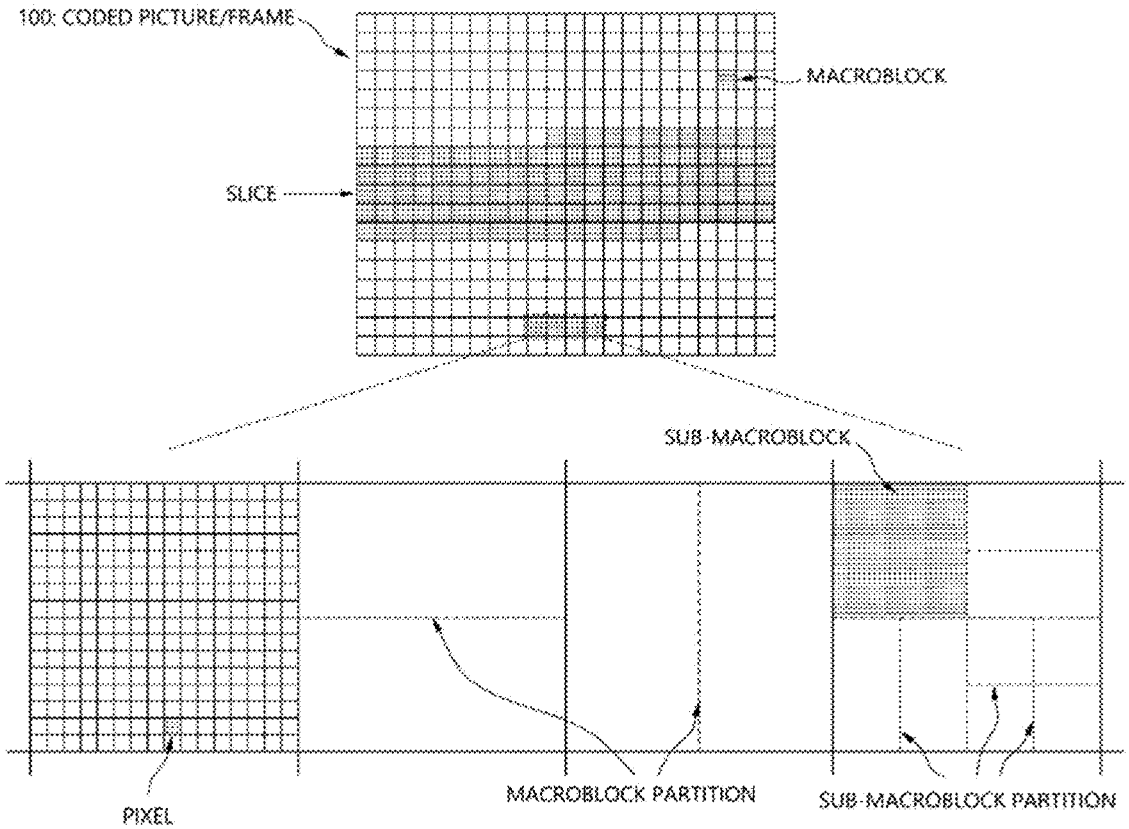
FIG. 4 is a schematic view showing the structure of a digital image frame according to an embodiment of the disclosure.

FIG. 4 is a schematic view showing the structure of the digital image frame. Referring to FIG. 4, the frame 100 may be composed of a plurality of macroblocks. The macroblocks may be used in formats such as JPEG, H.261, MPEG-1 Part 2, H.262/MPEG-2 Part 2, H.263, MPEG-4 Part 2, and H.264/MPEG-4 AVC. Each macroblock may be composed of 16×16 pixels (samples). In the structure of the frame 100 shown in FIG. 4, a QP value may be adjusted at a frame level or macroblock level in AVC/H.264 and HEVC. In such digital encoding formats, QP adjustment at the frame or macroblock level may be utilized as a method of bit rate control (RC) to improve transmission efficiency. Therefore, it may be possible to change the QP at the macroblock level or skip the motion vector or pattern information of the macroblock to be encoded, and use information from other surrounding macroblocks for encoding. The adjustment of QP or application of the skip mode as the RC method may be utilized in the methods of the present disclosure that will be described below.

Figure 5:
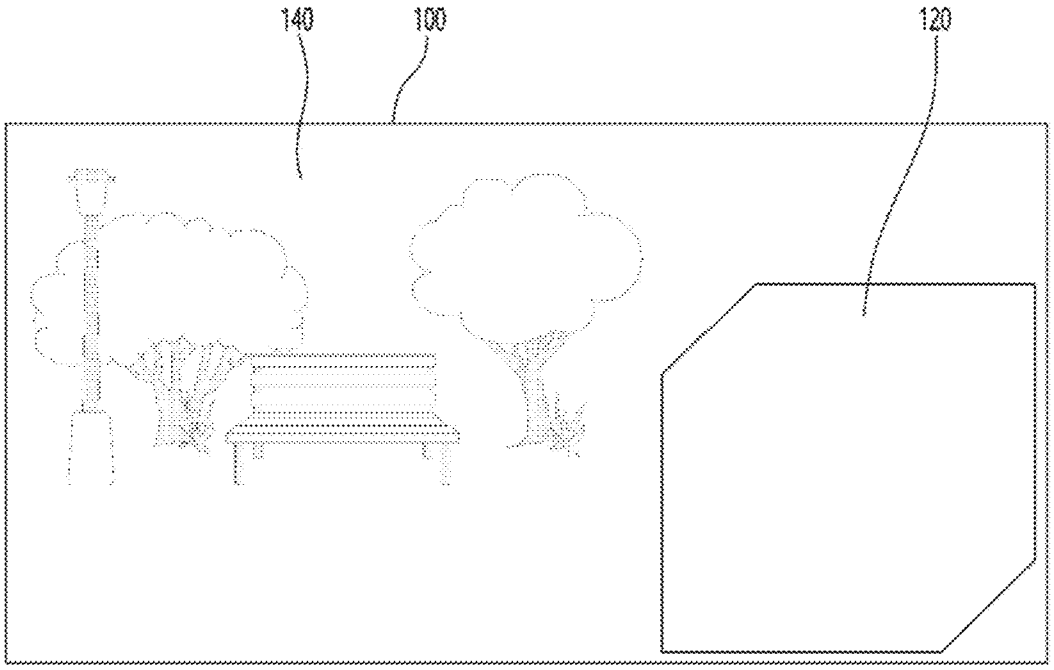
FIG. 5 is a diagram for explaining quantization coefficient settings when the privacy region is included in the frame of a digital image to be encoded as shown in FIG. 2 according to an embodiment of the disclosure.

FIG. 5 is a diagram for explaining adaptive encoding according to embodiments of the present disclosure for the frame 100 shown in FIG. 2. Referring to FIG. 5, the frame 100 may include the above-described mask 120 region and a general region 140. In the case of FIG. 5, the position of the mask 120 region may be fixed even if the frame is changed as long as the photographing parameter of the camera shown in FIG. 2 is not changed. Thus, for example, a solid mask may be applied to the mask 120 region. Furthermore, since there is no change in macroblock or pixel value between frames, the skip mode may be applied to the mask 120 region when encoding the frame 100. For example, when the skip mode is applied, an encoder may bypass an encoding of the frame 100 or a region such as a macroblock within the frame 100. Therefore, since the skip mode may be applied when there is no change in macroblock or pixel value between frames, unnecessary processing is avoided.

Figure 6:
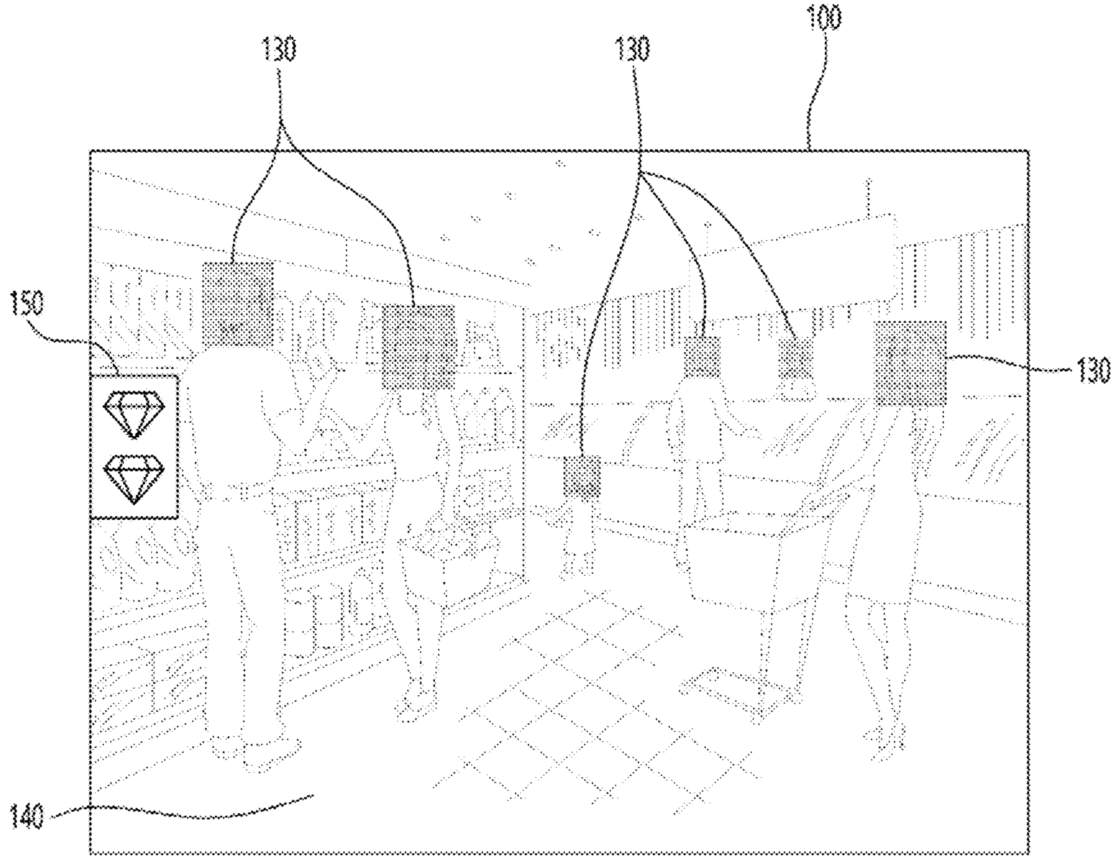
FIG. 6 is a diagram for explaining quantization coefficient settings when the privacy region is adaptively included in the frame of a digital image to be encoded as shown in FIG. 3 according to an embodiment of the disclosure.

FIG. 6 is a diagram for explaining adaptive encoding according to some embodiments of the present disclosure for the frame 100 shown in FIG. 3. The frame 100 shown in FIG. 6 may include a mosaic 130 region where privacy is required and a general region 140. Further, FIG. 6 may selectively or alternatively include a ROI 150 that requires higher image quality than the general region 140. In the frame 100 of FIG. 6, the region where privacy is required may be designated as the privacy region to which a high QP value may be applied as the mosaic 130 region. Further, regions where higher resolution may be required, such as a location of small valuable items or a car license plate, may be designated as the ROI 150 to which a low QP value may be applied, even if the bit rate increases. For the remaining regions other than the mosaic 130 region or the ROI 150, the frame 100 may be encoded by utilizing a value between the QP values applied to the regions 130 and 150 as the default QP value set for the frame.

Figure 7:
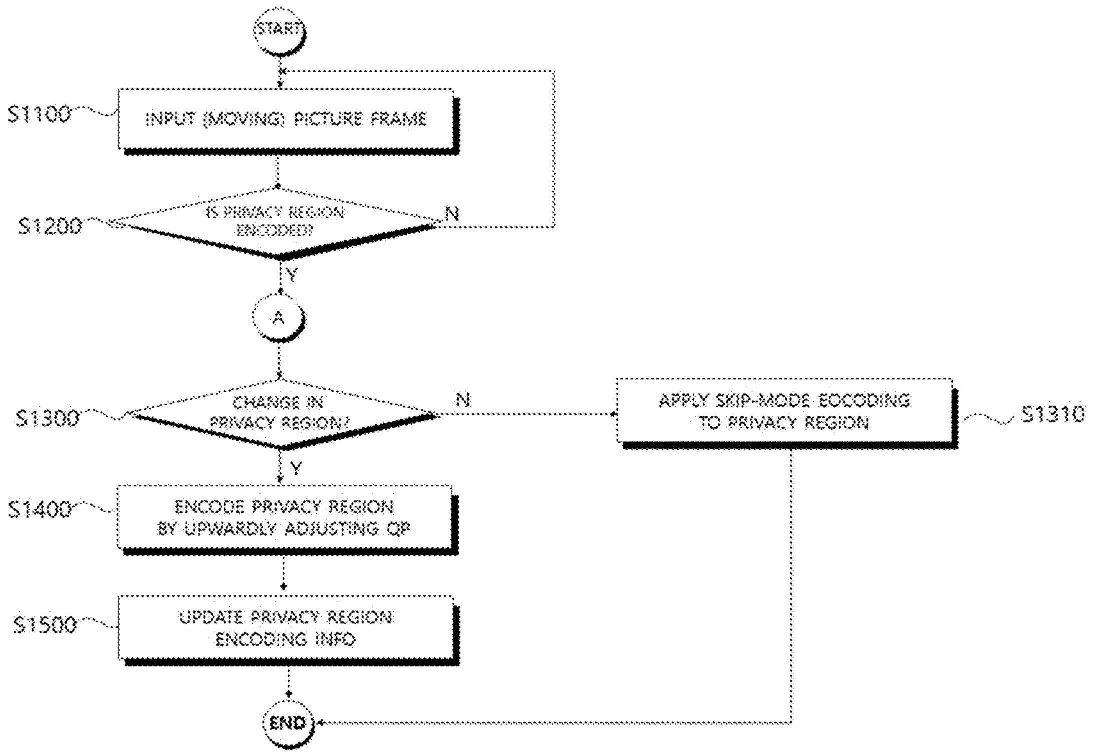
FIG. 7, FIG. 8, and FIG. 9 illustrate methods for setting quantization coefficients according to embodiments of the disclosure.

FIG. 7 is a flowchart showing a digital image encoding method according to an embodiment of the present disclosure that adaptively changes an encoding method on the basis of the presence and change of the privacy region. In step 1100, the image frame in FIG. 6 may be input. In step 1200, if the privacy region is not encoded in the input image frame, the image frame may be continuously input without separate processing for encoding the privacy region. On the other hand, in step 1200, when the privacy region is encoded (Y), it may be determined whether there is a change in the data of the privacy region. In step 1300, if the privacy region remains unchanged (N), this method may apply the above-described skip mode encoding to the privacy region (S1310) and conclude the process. On the other hand, in step 1300, if there is a change in the privacy region (Y), the QP value may be adjusted upward by increasing the QP. For example, in step 1400, the QP may be increased to a maximum value (max) provided by an encoder. Then, in step 1500, the encoding information including the increased QP value for the privacy region may be updated and this method ends. For example, when the encoding process ends, the image frame 100 based on the updated encoding information may be transmitted, stored, displayed, or the like.

Figure 8:
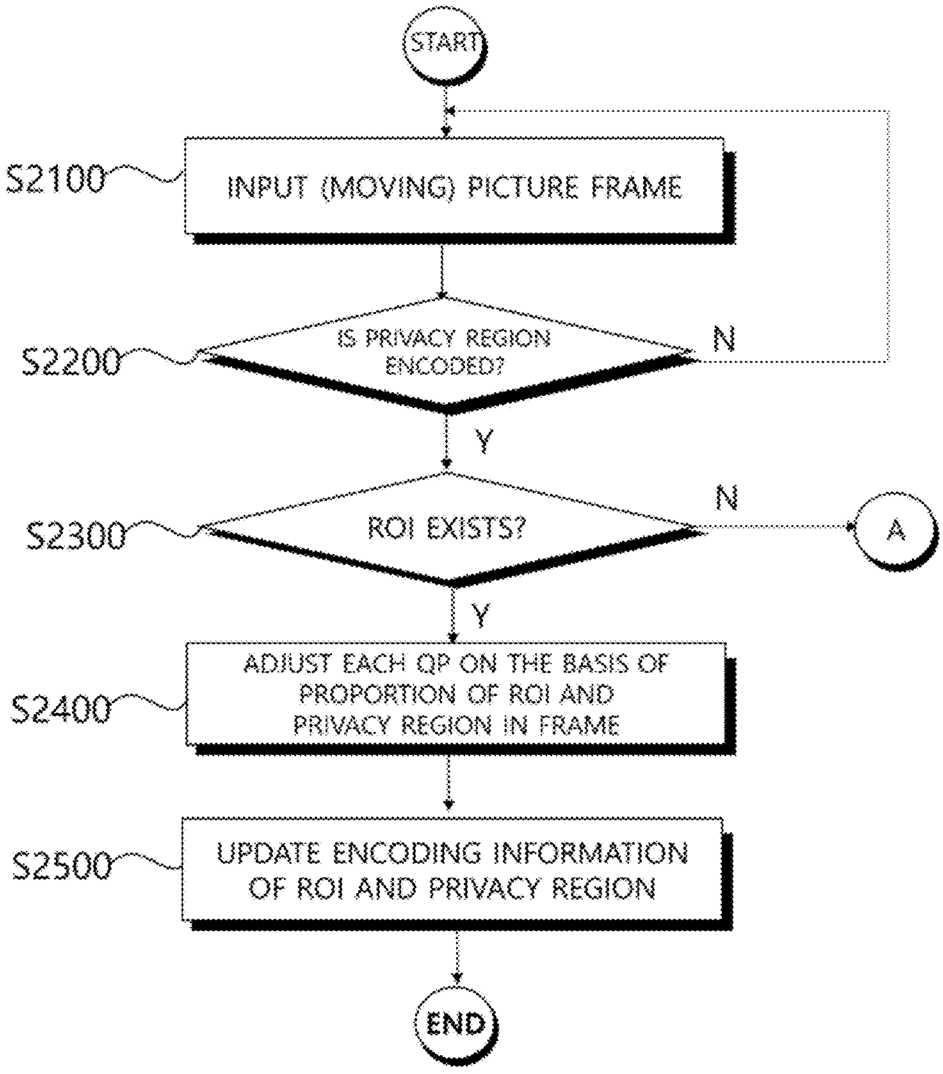

FIG. 8 illustrates a modified embodiment of the method shown in FIG. 7 when the ROI 150 exists in the image frame 100. In step 2100, the image frame may be input as in FIG. 7. In step 2200, it may be determined whether the privacy region (e.g. solid mask 120 or mosaic region 130) is encoded in the input frame 100. Referring to step 2300, if no privacy region exists (N), this method may continuously receive the image frame without separate processing for encoding the privacy region and the ROI. On the other hand, when the privacy region is encoded (Y), it may be determined whether the ROI also exists (S2300). If the ROI does not exist (N), the method may proceed to A of FIG. 7 and the steps described therein. On the other hand, when the ROI is included (Y in S2300), a difference in QP to be reduced for the ROI 150 and a difference in QP to be increased for the privacy region 120 and 130 may be adjusted according to a ratio of areas occupied by the ROI 150 and the privacy region 120 and 130 in the frame 100 (S2400). That is, by increasing the QP in the privacy region 120 and 130, the difference in QP applied to the ROI 150 may be reduced so that more bit rate may be allocated to the ROI 150 in proportion to the reduced bit rate. When the difference of QP for each region is calculated and adjustment is completed in step (S2400), encoding information including QP for each region may be updated (S2500), and the method may conclude. For example, when the encoding process ends, the image frame 100 based on the updated encoding information may be transmitted, stored, displayed, or the like.

Figure 9:
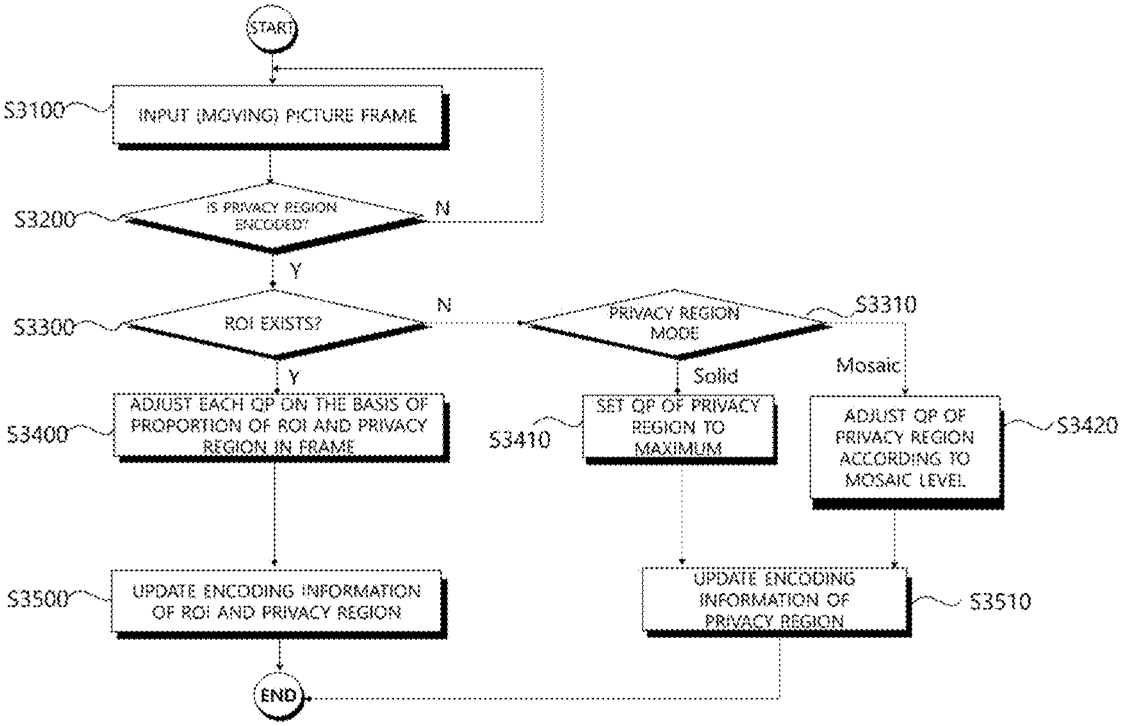

FIG. 9 is a flowchart illustrating an embodiment of an adaptive digital image encoding method according to the present disclosure that considers the type of a mask mode applied to the privacy region. Since the method shown in FIG. 9 is identical to the encoding method and steps S3100, S3200, S3300, S3400, and S3500 described with reference to FIG. 8, a difference will be mainly described. If it is determined that no ROI exists in step S3300 (N), that is, only the privacy region exists, the encoding mode of the privacy region may be determined (S3310). For example, if the privacy region mode is the solid mask, the quantization parameter of the privacy region may be set to a maximum value provided by the encoder or the skip mode may be applied as described with reference to FIG. 7 (S3410). When the privacy region mode is mosaic, the QP of the privacy region may be adjusted in reverse proportion to the grid size level of the mosaic (S3420). In other words, a lower QP may be applied when the mosaic grid size is larger, and a higher QP may be applied when the mosaic grid size is smaller. After the QP value is adjusted in steps S3410 and S3420, the encoding information of the privacy region may be updated (S3510), and the method may conclude. For example, when the encoding process ends, the image frame 100 based on the updated encoding information may be transmitted, stored, displayed, or the like.

Figure 10:
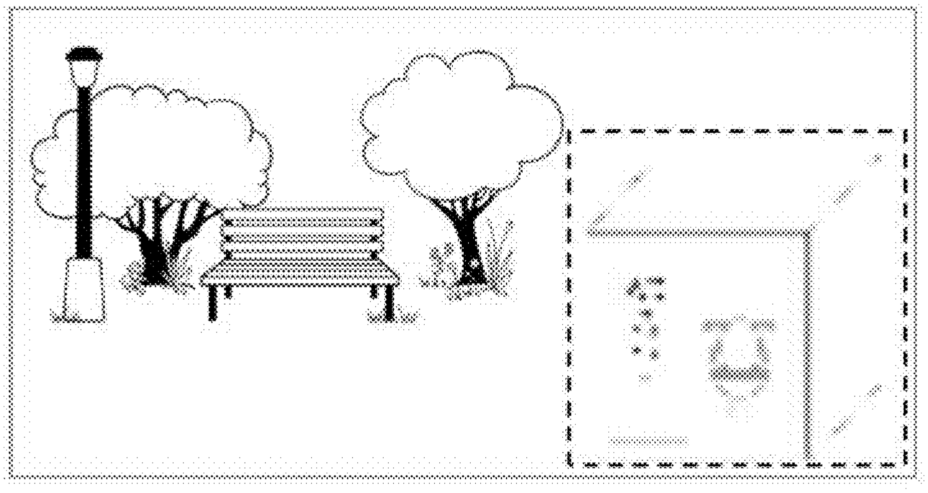
FIG. 10 shows a conceptual picture frame including a privacy region to which methods for setting quantization coefficients are applied according to one or more embodiments of the disclosure.
Figure 11:
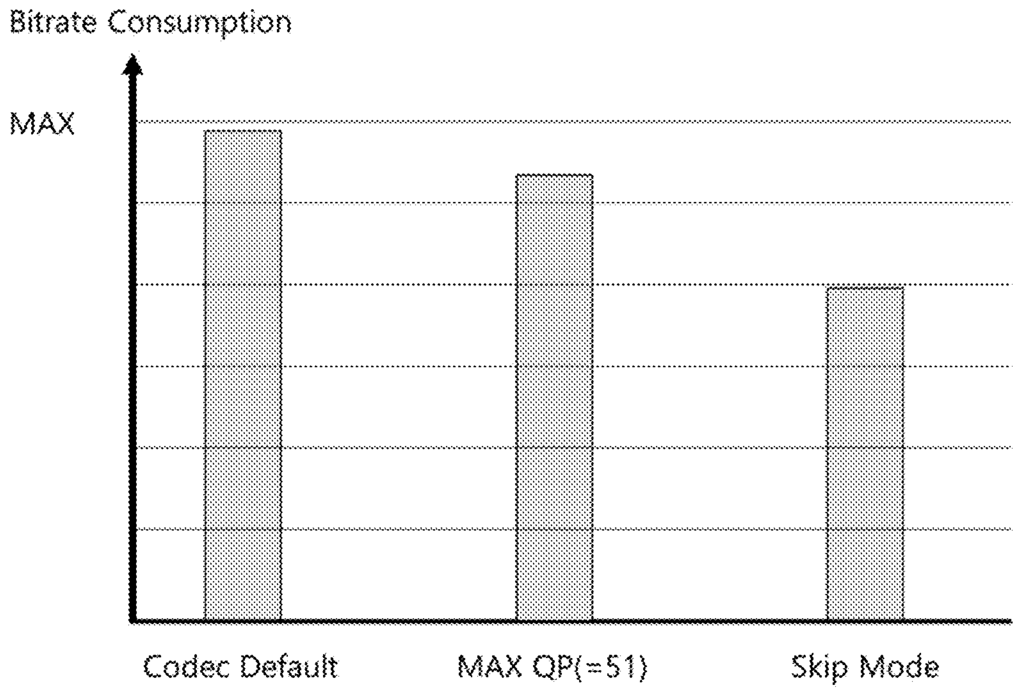
FIG. 11 is a graph conceptually showing a bit rate reduction effect required for encoding when methods for setting quantization coefficients are applied to the privacy region of FIG. 10 according to one or more embodiments of the disclosure.

With reference to FIGS. 5 and 6, FIGS. 7 to 9 describe methods for controlling the skip mode and QP based on the privacy region and ROI. Here, in the case of the privacy region, for example, in the case where the mosaic is applied as in a square region on the right side shown in FIG. 10, the expected results when the QP of the privacy region may be varied (increased) compared to the QP according to the default encoding method used for the corresponding frame, as illustrated in FIG. 11. The results may pertain to a picture including the mosaic region of FIG. 10. For example, the default encoding method, skip mode, and MAX QP(=51) may be applied to the privacy region as the QP control method that may be used in the H.265 video codec. In this connection, the skip mode means to directly utilize the information of a reference block of the privacy region (privacy mask region). MAX QP(QP=51) means that encoding is performed by setting QP to 51, which is the maximum QP value of the H.265 codec. In situations where network throughput is poor and the bit rate is low, i.e., resources are insufficient, it may be expected that the bit rate saving of the skip mode and MAX QP is more effective than that of the default encoding method. In such an environment, the skip mode may yield the greatest bit rate saving when applied to the privacy region. However, while the skip mode may be applied without any problem to the solid type privacy region as shown in FIG. 2, it may not be suitable for a case where the mosaic is applied as shown in FIG. 3. If movement within the mask region is not reflected, it may create a sense of inconsistency in video, so it may be appropriate to use a method such as MAX QP (=51) instead of the skip mode. However, as described with reference to FIG. 9, when the mosaic is applied, it may be possible to apply variable QP (S3410, S3420), and then switch back to applying the skip mode (S1310), as shown in FIG. 7, again when motion information in the corresponding privacy region disappears.

In the above description, steps, processes or operations may be further divided into additional steps, processes or operations, or combined into fewer steps, processes or operations, according to the implementation of the present disclosure. Further, some steps, processes or operations may be omitted as necessary, and the order of steps, processes or operations may be changed.

The examples described above may be implemented as software including instructions stored in machine-readable storage media or memory, which can be read by one or more processors or machines. For example, the examples described above or portions thereof may be implemented as software or code representations of physical circuits or logical representations convertible to physical circuits, such as any suitable type of hardware description language. The machine(s) refer to apparatuses that call instructions stored in a storage medium, and can operate according to the called instructions, and the apparatuses may include an electronic apparatus according to the embodiments disclosed herein. In case an instruction is executed by a processor, the processor may perform a function corresponding to the instruction by itself, or by using other components under its control. An instruction may include a code that is generated or executed by a compiler or an interpreter. A storage medium that is readable by processors or machines may be provided in the form of a non-transitory storage medium. Here, the term 'non-transitory' only means that a storage medium does not include signals, and is tangible, but does not indicate whether data is stored in the storage medium semi-permanently or temporarily.

The methods according to the various embodiments disclosed in the present document may be included and provided in a computer program product. The computer program product may be traded as a product between a seller and a purchaser. The computer program product may be distributed in a form of the machine-readable storage medium (for example, a compact disc read only memory (CD-ROM)), or may be distributed online through an application store (e.g., PlayStore™). In case of the online distribution, at least a part of the computer program product may be at least temporarily stored or temporarily provided in the storage medium such as a server memory of a manufacturer, a server memory of an application store, or a relay server memory.

The above-described embodiments are merely specific examples to describe technical content according to the embodiments of the disclosure and help the understanding of the embodiments of the disclosure, not intended to limit the scope of the embodiments of the disclosure. The terminologies or words used in the description and claims of the present disclosure should not be interpreted as being limited merely to common and dictionary meanings. On the contrary, they should be interpreted based on the meanings and concepts of the present disclosure according to one of ordinary skill in the art to which this disclosure pertains. The scope of the present disclosure is not limited to the embodiments disclosed in this specification, and the present disclosure may be modified, changed, or improved in various forms within the scope described in the spirit and claims of the present disclosure.

What is claimed is:

1. A method for encoding a digital image, the method comprising:

inputting a plurality of digital images respectively comprising a privacy region;

determining whether a change occurs in the privacy region within the plurality of digital images; and among the plurality of digital images, determining that no change occurs in the privacy region of a first digital image, and determining that a change occurs in the privacy region of a second digital image;

based on no change occurring in the privacy region within the first digital image, encoding the privacy region of the first digital image in a skip mode; and based on the change occurring in the privacy region within the second digital image, increasing a quantization coefficient (QP) of the privacy region of the second digital image.

2. The method of claim 1, further comprising:

updating encoding information of the privacy region of the second digital image based on the increase of the QP of the privacy region of the second digital image.

3. The method of claim 1, wherein, based on the change in the privacy region occurring within the second digital image, the QP of the privacy region of the second digital image is increased to a maximum value provided by an encoder.

4. The method of claim 1, further comprising: determining whether a region of interest (ROI) is included in the plurality of digital images, prior to the determining whether the change occurs in the respective privacy region within the plurality of digital images; and among the plurality of digital images, determining that the ROI is included in a third digital image, and determining that the ROI is not included in the first digital image or the second digital image; and adjusting a QP of the ROI and a QP of the privacy region in the third digital image based on the ROI being included in the third digital image.

5. The method of claim 4, wherein the adjusting the QP of the ROI comprises reducing the QP of the ROI of the third digital image.

6. The method of claim 4, wherein the adjusting the QP of the ROI and the QP of the privacy region is based on at least one of a ratio of the ROI and the privacy region in the third digital image and an amount of encoding resources saved in the privacy region of the third digital image.

7. The method of claim 5, wherein the adjusting the QP of the ROI and the QP of the privacy region in the third digital image is performed for each macroblock within the third digital image.

8. A method for encoding a digital image, the method comprising:

inputting a plurality of digital images respectively comprising a privacy region, wherein the plurality of digital images comprises a first digital image comprising a solid mask as the privacy region, and a second digital image comprising a mosaic mask as the privacy region;

determining whether a region of interest (ROI) is included in the plurality of digital images;

determining that the ROI is not included in the first digital image and the second digital image;

based on the ROI not being included in the first digital image and the second digital image:

increasing a quantization coefficient (QP) of the privacy region of the first digital image based on the privacy region being the solid mask, and updating encoding information of the privacy region of the first digital image based on a change of the QP of the privacy region of the first digital image, adjusting a QP of the privacy region of the second digital image according to a mosaic level based on the privacy region being the mosaic mask, and updating encoding information of the privacy region of the second digital image based on a change of the QP of the privacy region of the second digital image.

9. The method of claim 8, wherein the increasing the QP of the privacy region of the first digital image comprises setting the QP of the privacy region of the first digital image to a maximum value provided by an encoder based on the privacy region being the solid mask.

10. The method of claim 8, wherein the adjusting the QP of the privacy region of the second digital image comprises encoding the privacy region of the second digital image in a skip mode based on the privacy region being the mosaic mask.

11. The method of claim 8, wherein the plurality of digital images further comprises a third digital image comprising a privacy region, and wherein the method further comprises comprising: determining that the ROI is included in the third digital image; and based on the ROI being included in the third digital image:

adjusting a QP of the ROI and a QP of the privacy region of the third digital image based on a proportion of the ROI and the privacy region in the third digital image, and updating encoding information of the ROI and the privacy region of the third digital image based on the adjusted QP of the ROI and the adjusted QP of the privacy region of the third digital image.

12. The method of claim 8, wherein the plurality of digital images further comprises a third digital image comprising a privacy region, and wherein the method further comprises comprising:

determining that the ROI is included in the third digital image;

adjusting a QP of the ROI and a QP of the privacy region of the third digital image based on an amount of encoding resources saved in the privacy region of the third digital image; and updating encoding information of the ROI and the privacy region of the third digital image based on the adjusted QP of the ROI of the third digital image.

13. The method of claim 8, wherein the plurality of digital images further comprises a third digital image comprising a privacy region, and wherein the method further comprises comprising:

determining that the ROI is included in the third digital image; and based on the ROI being included in the third digital image:

adjusting a QP of the ROI and a QP of the privacy region of the third digital image based on a proportion of the ROI and the privacy region in the third digital image and an amount of encoding resources saved in the privacy region of the third digital image, and updating encoding information of the ROI and the privacy region of the third digital image based on the adjusted QP of the ROI and the adjusted QP of the privacy region of the third digital image.

14. The method of claim 11, wherein the adjusting the QP of the ROI comprises reducing the QP of the ROI of the third digital image.

15. The method of claim 11, wherein the adjusting the QP of the privacy region comprises increasing the QP of the privacy region of the third digital image.

16. A non-transitory computer-readable recording medium storing a computer-executable program including instructions for executing a method for encoding a digital image including a privacy region, the method comprising:

determining whether a change occurs in the privacy region within the digital image; and based on no change occurring in the privacy region within the digital image, encoding the privacy region in a skip mode, and based on the change occurring in the privacy region within the digital image, increasing a quantization coefficient (QP) of the privacy region.

17. A non-transitory computer-readable recording medium storing a computer-executable program comprising instructions, which, when executed by one or more processors, cause the one or more processors to execute a digital image encoding method comprising:

inputting a digital image comprising a plurality of frames, wherein first frames of the plurality of frames comprise a privacy region, and second frames of the plurality of frames comprise a privacy region and a region of interest (ROI);

determining whether a change occurs in the privacy region within the digital image;

based on no change occurring in the privacy region within the digital image, encoding the privacy region in a skip mode;

based on the change occurring in the privacy region among the plurality of frames, increasing a quantization coefficient (QP) of the privacy region; and updating encoding information of the digital image.

18. The non-transitory computer-readable recording medium of claim 17, wherein, with respect to the first frames:

the increasing the QP of the privacy region comprises at least one of:

increasing the QP of the privacy region based on the privacy region being a solid mask, and adjusting the QP of the privacy region according to a mosaic level based on the privacy region being a mosaic mask; and the updating the encoding information comprises updating encoding information of the privacy region based on the change of the QP of the privacy region.

19. The non-transitory computer-readable recording medium of claim 18, wherein, with respect to the second frames:

the increasing the QP of the privacy region comprises:

increasing the QP of the privacy region based on an area ratio of the ROI and the privacy region, and decreasing the QP of the ROI in proportion to the increase in QP of the privacy region; and the updating the encoding information comprises updating the encoding information of the ROI and the privacy region.

20. The non-transitory computer-readable recording medium of claim 19, wherein the plurality of frames comprise a default region, different than the ROI and the privacy region, wherein, among the plurality of frames, a QP of the default region is less than the QP of the privacy region, and wherein, among the second frames of the plurality of frames, the QP of the default region is greater than the QP of the ROI.

* * * * *